United States Patent
Habasaki et al.

(10) Patent No.: US 8,245,541 B2
(45) Date of Patent: Aug. 21, 2012

(54) EQUIPMENT FOR PROVIDING TWIST TO AN OPTICAL FIBER

(75) Inventors: Toshimi Habasaki, Yokohama (JP); Mitsuru Takagi, Yokohama (JP); Yuji Abe, Yokohama (JP); Hisashi Kasai, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 276 days.

(21) Appl. No.: 12/578,058

(22) Filed: Oct. 13, 2009

(65) Prior Publication Data
US 2010/0095708 A1    Apr. 22, 2010

(30) Foreign Application Priority Data
Oct. 20, 2008  (JP) ................... 2008-269910

(51) Int. Cl.
C03B 37/03   (2006.01)
(52) U.S. Cl. .......................... 65/402; 65/539
(58) Field of Classification Search .............. 65/402, 65/539
See application file for complete search history.

(56) References Cited

U.S. PATENT DOCUMENTS
5,298,047 A    3/1994   Hart, Jr. et al.
7,317,855 B2   1/2008   Chen et al.

FOREIGN PATENT DOCUMENTS
| EP | 0 729 919 A  | 9/1996 |
| EP | 0 744 636 A2 | 11/1996 |
| EP | 1 325 894 A  | 7/2003 |
| JP | 09-243833    | 9/1997 |
| JP | 2000-143277 A | 5/2000 |
| JP | 2002-226229  | 8/2002 |

OTHER PUBLICATIONS

Machine translation of JP 2000-143277, Naka Yahuhiro, Continuous Twisting Device for Optical Fiber, May 2000.*
European Search Report issued in European Patent Application No. EP 09 01 3029.5 dated Dec. 21, 2009.

* cited by examiner

Primary Examiner — Queenie Dehghan
(74) Attorney, Agent, or Firm — McDermott Will & Emery LLP

(57) ABSTRACT

Simple and small-sized equipment which continuously afford alternate twists to an optical fiber and a method using the apparatus are provided. The equipment includes: a guide roller for causing the fiber to roll; a roller supporting member for holding the roller in a manner allowing the roller to freely turn about an axial center X; and a driving unit to cause the roller to oscillate by making the supporting member to turn about an axial center Y that is inclined relative to the axial center X. The method includes: arranging a guide roller to intersect the fiber, the roller being held by a roller supporting member to freely turn about an axial center X; oscillating the roller by driving the supporting member to revolve about the axial center Y which is inclined relative to the axis center X; and causing the fiber to roll to afford alternate twists to the fiber.

3 Claims, 6 Drawing Sheets

EQUIPMENT FOR PROVIDING TWIST TO AN OPTICAL FIBER

BACKGROUND OF THE INVENTION

1. Field of the Invention

The present invention relates to equipment and methods for manufacturing an optical fiber.

2. Description of the Background Art

It is difficult to form the core portion and the cladding portion in a perfectly circular and concentric shape in manufacturing an optical fiber. It is often the case that the core portion and the cladding portion become slightly ellipsoidal or distorted such that the cross-sectional refractive index profile of the optical fiber is not axial symmetry. As a result, the group velocities of mutually orthogonal two polarization modes that propagate in the optical fiber tend to differ from each other, and accordingly the polarization mode dispersion (PMD) increases. It is known that for manufacturing an optical fiber from an optical fiber preform, the drawing process is performed while affording twists to the optical fiber so that the PMD may be reduced.

FIGS. 5A and 5B are drawings illustrated in Japanese Patent Application Publication No. H9-243833: FIG. 5A is a conceptional schematic diagram and FIG. 5B is a perspective view. In this method, the twists are afforded to an optical fiber 1 by using an oscillating guide roller 2. In the oscillating guide roller 2, the axial center X, about which it turns, oscillates alternately in the range of $+\theta$ and $-\theta$, and as the arrow "a" indicates, the roller surface 2a sways between the position defined by the solid line and the position defined by the dotted line. Accordingly, an optical fiber 1 which has passed a guide bar 3 rolls on the top of the swaying roller surface 2a so that twists are afforded thereto in an alternate twisting direction.

The oscillating mechanism 10 has a pinion gear 12 arranged to turn on a base 11, and the oscillating guide roller 2 is supported by means of a supporting shaft 14 so as to be mounted to a roller support body 13 that is fixed on the pinion gear 12. Also, one end of a drive arm 16 is connected with a pin 16a to a turning plate 15 driven by a motor on the base 11 and the other end is connected to a slide member 19 arranged on a movable member 17. The movable member 17 has a rack gear 18 which is meshed with the pinion gear 12 so as to afford a turning drive to the pinion gear 12, and a guide part 17a helps the movable member 17 to move to and fro in the direction indicated by an arrow "b" along the guide groove provided on the base 11. Also, a guide protrusion 19a guides a slide member 19 to slide in the direction indicated by an arrow "c".

When the turning plate 15 is driven to turn at a constant speed, the pin 16a of the drive arm 16 moves in a circle such that the arm 16 moves to and fro. As a result of the movement of the drive arm 16, the slide member 19 moves in the direction of the arrow "c" on the guide protrusion 19a while the movable member 17 performs a linear movement in the direction of the arrow "b". The pinion gear 12, which meshes with a rack gear 18, is caused to perform an oscillating rotational movement in the direction of an arrow "d" by the linear movement of the movable member 17. The oscillating rotational movement "d" of the pinion gear 12 causes the oscillating guide roller 2 to oscillate in the oscillating range "a".

FIGS. 6A and 6B are drawings which illustrate the method described in Japanese Patent Application Publication No. 2002-226229: FIG. 6A is a side view and FIG. 6B is a front view. In this method, twists are afforded to an optical fiber 1 by reciprocating rollers 21 and 22.

The reciprocating rollers 21 and 22 are supported in parallel by a base frame 25, and a first guide roller 23 arranged above the roller 21 and a second guide roller 24 arranged below the roller 22 push the optical fiber 1 onto the surface of the reciprocating rollers 21, 22. The surfaces of the reciprocating rollers 21, 22 have a coefficient of friction which is sufficient for the optical fiber 1 to roll without sliding thereon. The reciprocating rollers 21, 22 are caused to turn by the running of the optical fiber 1, while the reciprocating rollers 21 and 22 are moved to and fro in mutually opposite directions at a given period. Thus, the optical fiber 1 rolls on the surface of the reciprocating rollers 21 and 22, so that twists are afforded to the optical fiber 1. The number of the reciprocating rollers provided in such case is supposed to be one or more than two.

These known mechanisms are complicated and the relevant equipment is inevitably large-sized. Also, the driving direction of the rollers is reversed so that the direction of twist in the optical fiber may be reversed. And, at the time of such reversion, the twisting operation is interrupted temporarily. Therefore, the twisting speed is slow, and the number of twisting times becomes less, resulting in increase of variation in the PMD characteristics.

SUMMARY OF THE INVENTION

The object of the present invention is to provide equipment and a method for manufacturing an optical fiber, such that the structure for affording twists to the fiber is simple and small-sized, allowing continuous and effective twisting operation without interruption at the time of reversing the twisting direction.

To achieve the object, equipment for manufacturing an optical fiber is provided, which is capable of affording alternate twists to the optical fiber and which comprises (1) a guide roller arranged in a manner intersecting the traveling direction of the optical fiber and causing the optical fiber to roll in contact with the surface thereof, (2) a roller supporting member for holding the guide roller in a manner allowing the guide roller to freely turn about an axial center X, and (3) a driving unit to cause the guide roller to oscillate by making the roller supporting member to turn about its turning axis, that is, an axial center Y, which is inclined relative to the axial center X.

According to one embodiment of the invention, the roller supporting member is a roller supporting shaft which is along the axial center X, and in another embodiment, the guide roller is supported by a cantilever lying along the axial center Y. Preferably, the inclination angle of the axial center X relative to the axial center Y is changeable. It is preferable that the guide roller have a brim portion having a taper spreading outward at each end of the roller and that the inclination angle $\theta$ of the axial center X with respect to the axial center Y satisfy the following formula:

$$\tan\theta \leq \frac{T}{\sqrt{(R+H)^2 - R^2}},$$

where T is a thickness, and H is a height, of the brim portion, and R is a radius of the roller. These preferred embodiments can be combined together.

In addition, a method of manufacturing an optical fiber is provided as another embodiment of the invention. The method comprises: arranging a guide roller so as to intersect the advancing direction of the optical fiber, the guide roller being held by a roller supporting member so as to freely turn about an axial center X; oscillating the guide roller by driving the roller supporting member to revolve about the axial center Y, the axial center Y being inclined relative to the axis center X; and thereby causing the optical fiber to roll in contact with the surface of the guide roller so as to afford alternate twists to the optical fiber.

BRIEF DESCRIPTION OF THE DRAWINGS

FIG. 1A is a partial sectional view thereof; FIG. 1B is a schematic diagram illustrating the positional arrangement; and FIG. 1C is a graph showing the oscillating speed of the guide roller in the oscillating mechanism.

FIG. 5A is a conceptional schematic diagram, and FIG. 5B is a perspective view.

FIG. 6A is a side view, and FIG. 6B is a perspective view.

DETAILED DESCRIPTION OF THE INVENTION

The above-mentioned features and other features, aspects, and advantages of the present invention will be better understood through the following description, appended claims, and accompanying drawings. In the explanation of the drawings, an identical mark is applied to identical elements and an overlapping explanation will be omitted.

Figure 1A:
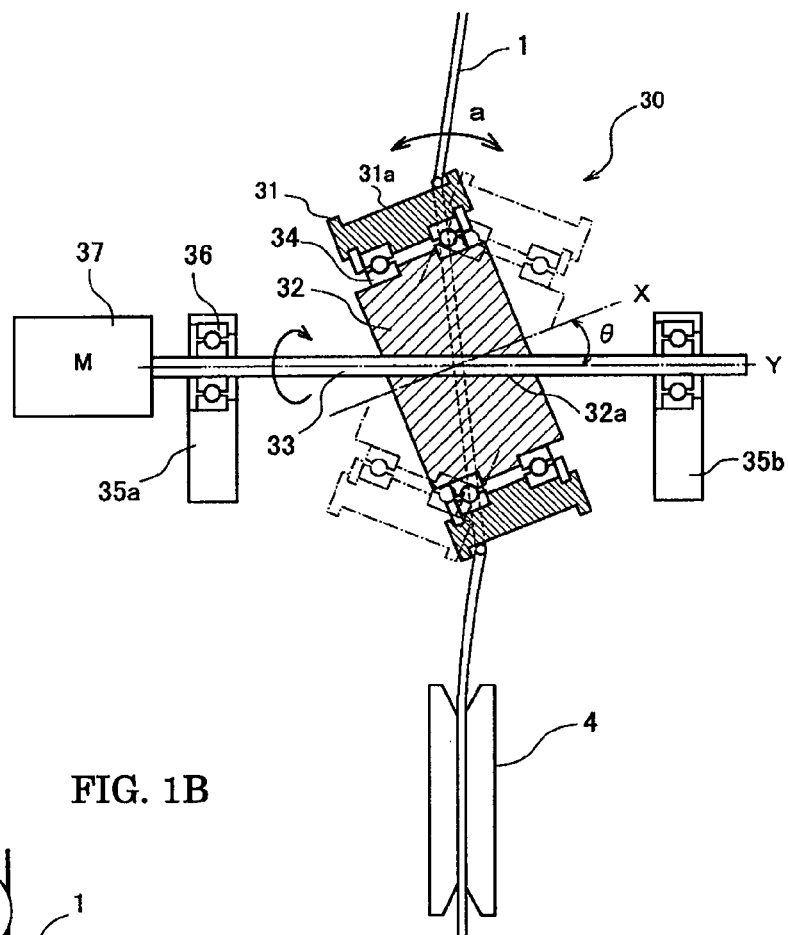
FIGS. 1A to 1C are drawings for illustrating the oscillating mechanism of the guide roller in a first embodiment of optical fiber manufacturing equipment according to the present invention.
Figure 1B:
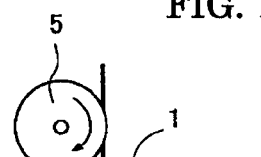
Figure 1C:
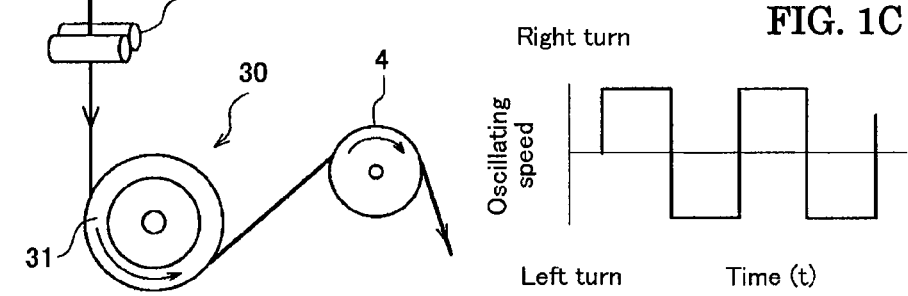

FIGS. 1A to 1C are drawings for illustrating the oscillating mechanism of the guide roller in a first embodiment of optical fiber manufacturing equipment according to the present invention, and FIG. 1A is a partial sectional view. An oscillating mechanism 30 comprises a guide roller 31 that is attached to a roller supporting member (support block) 32 through one pair of bearings 34 so as to be free to turn, the support block 32 being structured to rotate integrally with the rotating shaft 33. The rotating shaft 33 is supported at both ends by rotating-shaft supporting bodies 35a and 35b through shaft supports 36 composed of bearings. A drive motor 37 is combined to one end of the rotating shaft 33, so that the rotating shaft 33 and the support block 32 are turned in one direction at a given number of rotations.

The guide roller 31 freely turns around the support block 32, using the axial center X as its center. In the first embodiment, the axial center X has an inclination angle θ to the axial center Y of the rotating shaft 33 of the drive motor 37. Therefore, the axial hole 32a of the support block 32 that rotates integrally with the shaft 33 is formed slantingly with an inclination angle θ relative to the axial center X.

When the rotating shaft 33 is driven to rotate in one direction at a given turning speed by the drive motor 37, the support block 32 is turned integrally with the rotating shaft 33. Then, the guide roller 31 which is arranged concentrically around the outer circumference of the support block 32 moves as shown by an arrow "a" from the position of a solid line to the position of a dot-dash line by a half rotation of the support block 32. In the subsequent half rotation, the guide roller 31 moves from the position of the dot-dash line to the position of the solid line. That is, the position of the guide roller 31 oscillates so as to return to the original position by one rotation of the rotating shaft 33. (The oscillating range "a" of the guide roller can be changed by an inclination angle θ.) Accordingly, twists are afforded to the optical fiber 1 as the optical fiber 1 rolls on the roller surface 31a.

FIG. 1B is a schematic diagram illustrating the positional arrangement of the oscillating mechanism 30. The oscillating mechanism 30 is arranged between a fixed roller 4 and a guide roller 5. The optical fiber 1 is led by guide bars 3 to a given position of the oscillating mechanism 30, so that it is wound around the roller surface 31a of the guide roller 31, with an orbit of 90° or more, for example. Also, the optical fiber 1 can roll without slipping on the roller surface 31a, since the roller surface 31a of the guide roller 31 is generally formed of a material having a large frictional coefficient. Consequently, alternate twists are afforded to the optical fiber 1 by the oscillation of the guide roller 31.

As in the first embodiment, if the oscillating equipment is installed at a position which lies in the range following the step of providing a protective coating onto a glass fiber in the process of drawing an optical fiber from an optical fiber preform, it is possible to afford twists (in this case, it is also called as spins) to the glass fiber itself that is in a fused condition by heating. However, the twists may be afforded to an optical fiber when it is subjected to a coloring or rewinding process after it has been drawn, provided with a protective coating, and wound on a take-up reel.

FIG. 1C is a graph showing the oscillating speed of the guide roller in the oscillating mechanism 30. If the rotation of the rotating shaft 33 is constant, the speed of oscillation (right turn) of the guide roller 31 shown in FIG. 1A between the condition indicated by the solid line from the condition indicated by a dot-dash line while the rotating shaft turns by a half rotation is constant. Also, the succeeding oscillating speed (left turn) of the guide roller 31 from the condition indicated by the dot-dash line to the condition indicated by the solid line during the following half-rotation of the rotating shaft is constant. Here, the reverse of the oscillating direction is continuously done without undergoing operational stoppage with one-directional rotation of the rotating shaft 33, and accordingly the twisting operation of the optical fiber can also be done without interruption of operation.

Figure 2:
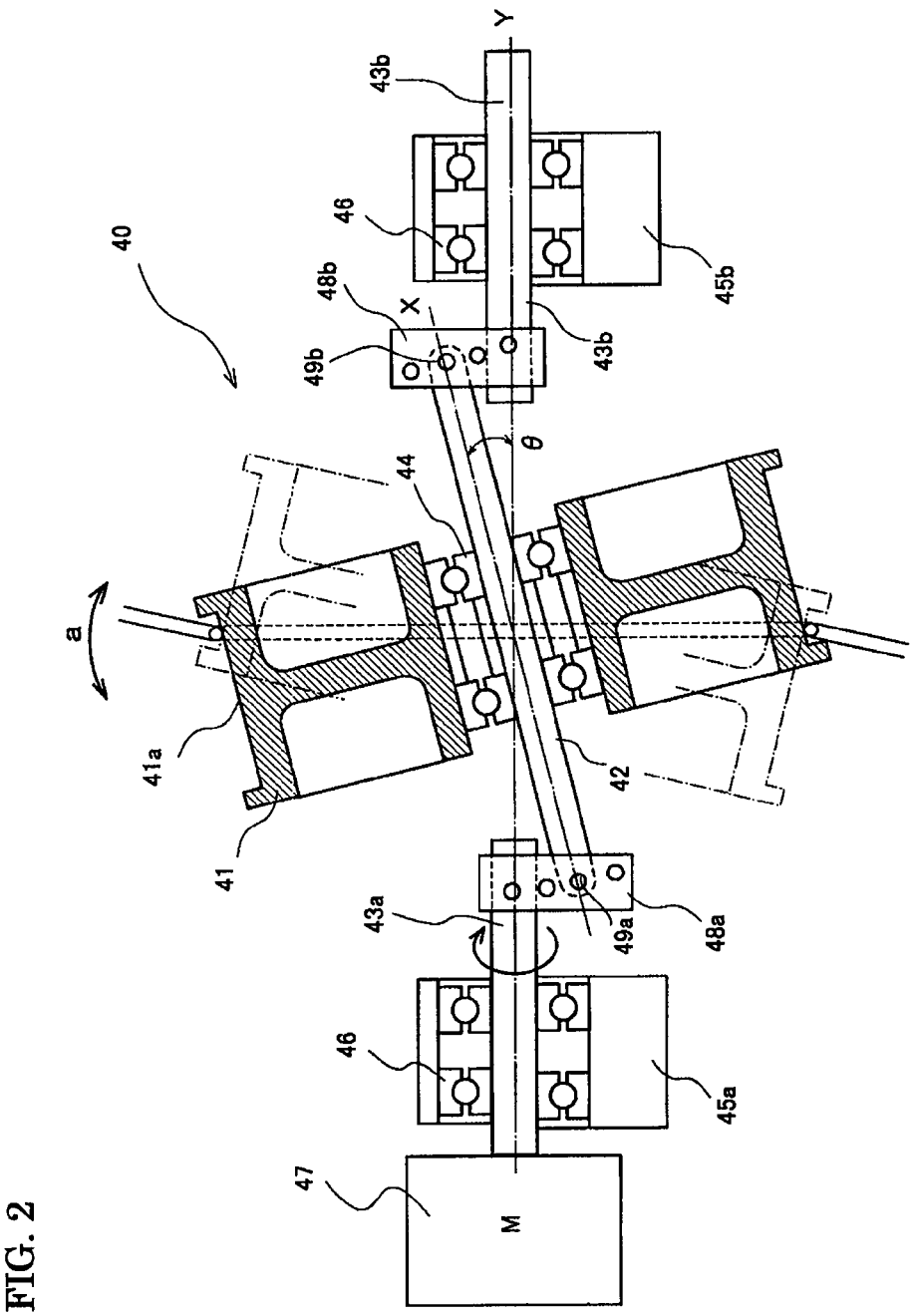
FIG. 2 is a partial sectional view illustrating the oscillating mechanism of a guide roller in a second embodiment of the optical fiber manufacturing equipment of the present invention.

FIG. 2 is a partial sectional view illustrating an oscillating mechanism 40 of a guide roller in the second embodiment of the optical fiber manufacturing equipment of the present invention. The oscillating mechanism 40 is an example of supporting a guide roller 41 so as to allowing its free rotation by using a roller supporting member (roller supporting shaft) 42 that is arranged to coincide with the axial center X of the guide roller 41. The roller supporting shaft 42 is connected at its both ends with rotating shafts 43a and 43b through angle adjusting members 48a and 48b, respectively, so as to be fixed to have a given angle θ to the rotating shaft 43a and 43b.

In the second embodiment, the roller supporting shaft 42 that supports the guide roller 41 is coincident with the axial center X of the guide roller 41, and not inclined like the rotating shaft 33 of the first embodiment. Thus, the guide roller 41 can be supported with one pair of small-diameter bearings 44. Supporting the guide roller 41 with the small-diameter bearings enables not only a low-cost bearing mechanism, but also decrease in the rotational resistance (mechanical loss) of the roller. The final rolling-up tension of an optical fiber must be reduced to about tens of grams, and therefore the decrease in the bearing diameter of the guide roller 41 is effective for attaining a preferable value of the rolling-up tension.

The rotating shafts 43a and 43b are supported by rotating-shaft supporting bodies 45a and 45b, respectively, through shaft supports 46 that are composed of bearings. A drive motor 47 is combined with the rotating shaft 43a, which turns in one direction at a given number of rotations. The guide roller 41 may be supported using the support block and bearings of large-sized diameter like the first embodiment, instead of supporting with small-diameter bearings 44.

Angle adjusting members 48a and 48b having a plurality of adjusting pins 49a and 49b are installed at the inner end of the rotating shafts 43a and 43b, respectively. The roller supporting shaft 42 can be connected with the rotating shafts 43a and 43b so as to be fixed at a given angle, such as 5°, 10°, 15°, or the like with respect to the axial center Y of the rotating shafts 43a and 43b, by choosing the adjusting pins 49a and 49b, and thereby the roller supporting shaft 42 can be rotated integrally with the rotating shaft 43a and 43b.

In the oscillating mechanism 40, when the rotating shaft 43a is rotated at a give speed by the drive of the drive motor 47, the roller supporting shaft 42 is caused to turn together with the rotating shaft 43a and 43b. Then, the guide roller 41 which is arranged concentrically on the roller supporting shaft 42 moves, as shown by the arrow "a", from the position of the solid line to the position of the dot-dash line according to a half rotation of the rotating shafts 43a and 43b like the guide roller 31 of the first embodiment. At the subsequent half rotation, the guide roller 41 moves from the position of the dot-dash line to the position of the solid line. That is, the position of the guide roller 41 oscillates, returning to the original position by one rotation of the rotating shaft 43a. Thus, by the oscillation of the guide roller 41, the optical fiber 1 is caused to roll on the roller surface 41a, changing the rolling direction alternately, and thereby alternate twists are afforded to the optical fiber.

Figure 3:
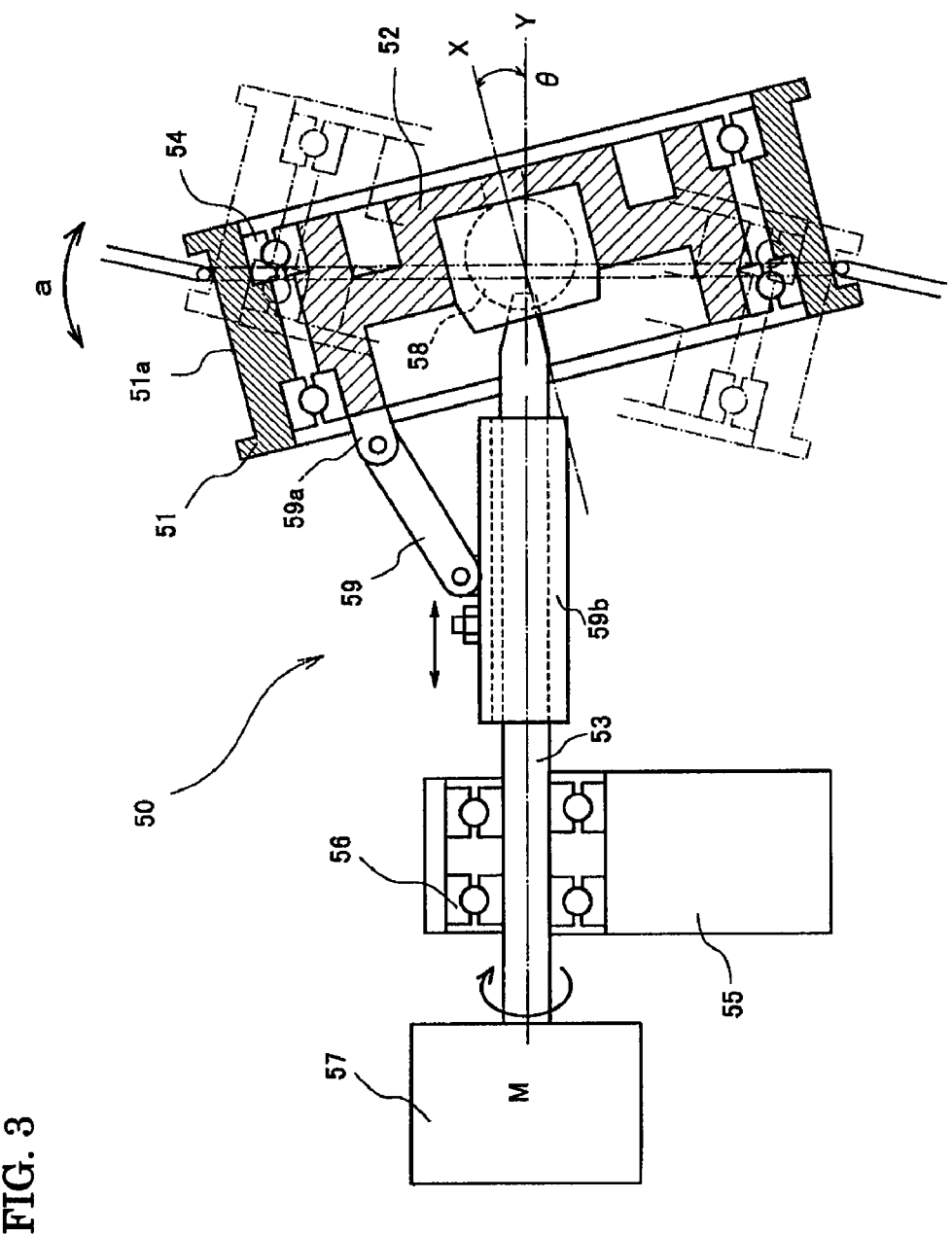
FIG. 3 is a partial sectional view illustrating the oscillating mechanism of a guide roller in a third embodiment of the optical fiber manufacturing equipment of the present invention.

FIG. 3 is a partial sectional view illustrating the oscillating mechanism 50 of a guide roller in the third embodiment of the optical fiber manufacturing equipment of the present invention. In the oscillating mechanism 50, the guide roller 51 is supported through one pair of bearings 54 so as to be free to turn at a roller supporting member (support joint) 52. The support joint 52 is connected to one end of a rotating shaft 53 through a joint member 58 provided in its inside. The rotating shaft 53 is supported by a rotating-shaft supporting body 55 through a shaft support 56 composed of bearings. A drive motor 57 is combined with the other end of the rotating shaft 53, and the rotating shaft 53 is turned in one direction at a given number of rotations. In the oscillating mechanism 50, the guide roller is supported by cantilever and its oscillating angle is variable.

The guide roller 51 turns about the axial center X of the guide roller 51, freely revolving around the support joint 52. The support joint 52 is connected so as to be fixed at a given angle θ with respect to the axial center Y of the rotating shaft 53. The rotating shaft 53 is provided with an adjusting sleeve 59b for installing the support joint 52 at a given angle, and the adjusting sleeve 59b is connected to one end of the angle adjusting arm 59. The other end of angle adjusting arm 59 is connected to a tab 59a that is provided on the support joint 52. By adjusting the position of the adjusting sleeve 59b in a direction of the arrow on the rotating shaft 53, the axial center X of the guide roller 51 and the axial center Y of the rotating shaft 53 can be set to a given angle θ.

When the rotating shaft 53 is driven at a given turning speed by the drive motor 57, the support joint 52 is rotated together with the rotating shaft 53 through the angle adjusting arm 59 and the joint member 58. Then, the guide roller 51 which is arranged concentrically on the support joint 52 moves as shown by arrow "a" from the position of the solid line to the position of the dot-dash line at a half rotation of the rotating shaft 53 as in the case of the guide roller 31 of the first embodiment. At the subsequent half rotation, the guide roller 51 moves from the position of the dot-dash line to the position of the solid line. That is, the position of the guide roller 51 oscillates, returning to the original position by one rotation of the rotating shaft 53. Thus, by the oscillation of the guide roller 51, the optical fiber 1 is caused to roll on the roller surface 51a, changing the rolling direction alternately, and thereby alternate twists are afforded to the optical fiber.

Figure 4A:
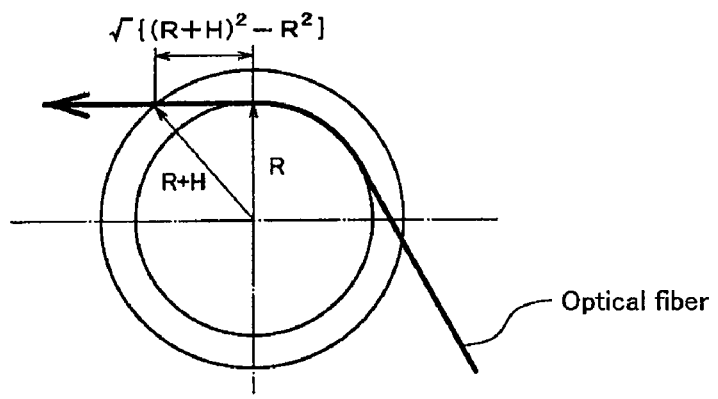
FIGS. 4A and 4B are conceptional schematic diagrams for explaining the positional relationship between an optical fiber and the brim portion of a guide roller in the optical fiber manufacturing equipment of the present invention.
Figure 4B:
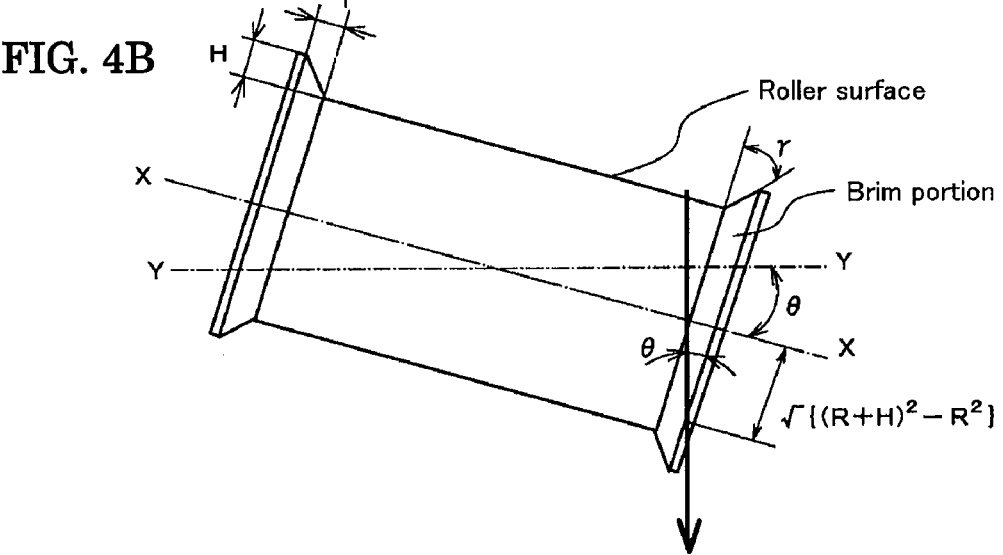
Figure 5A:
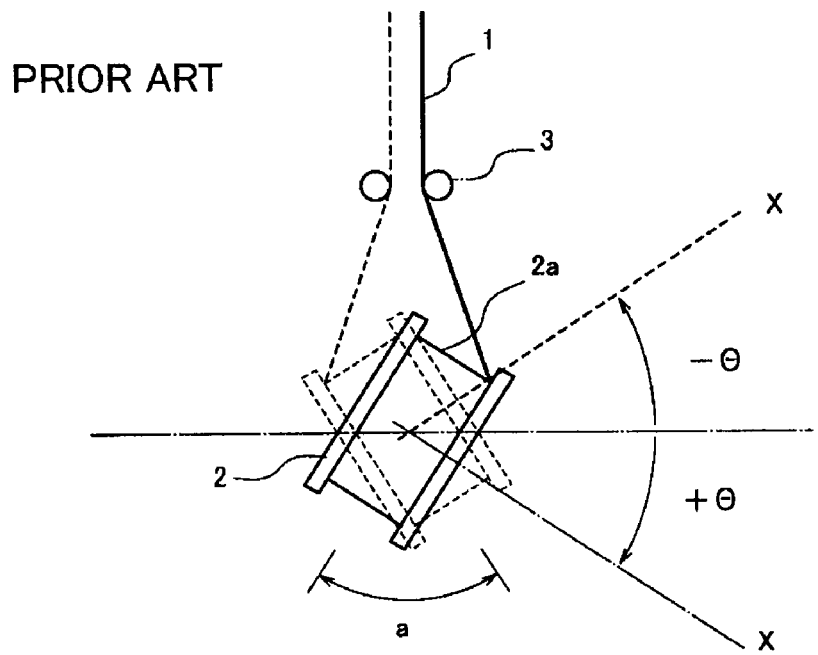
FIGS. 5A and 5B are drawings illustrating a conventional method.
Figure 5B:
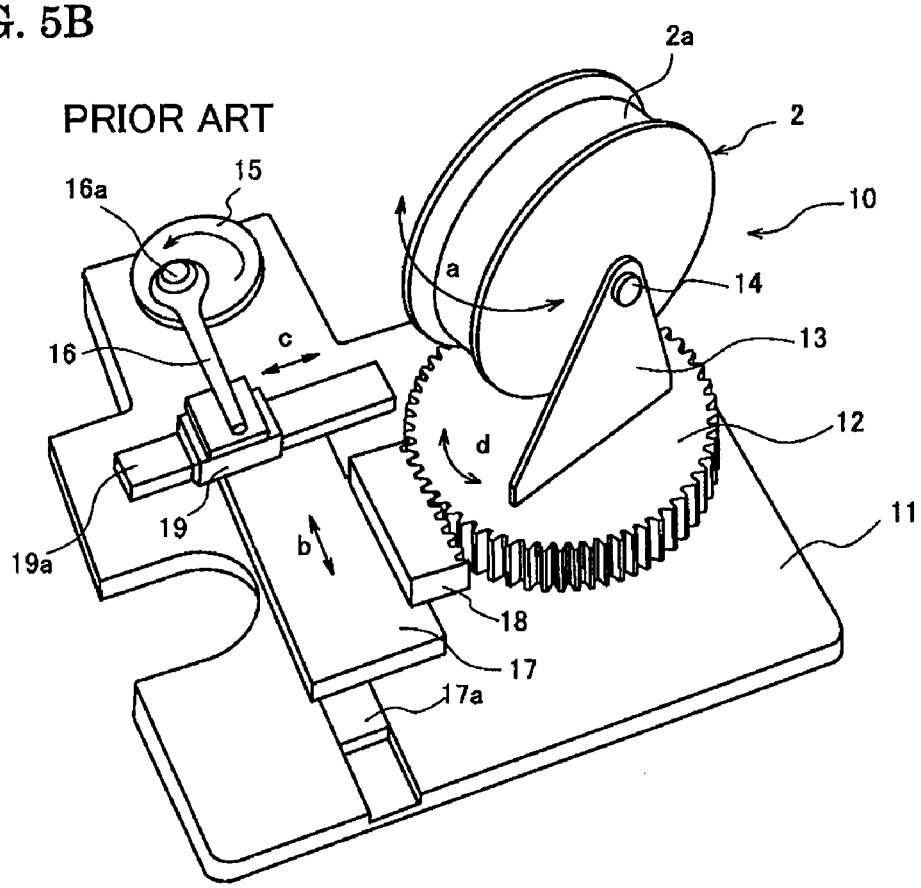
Figure 6A:
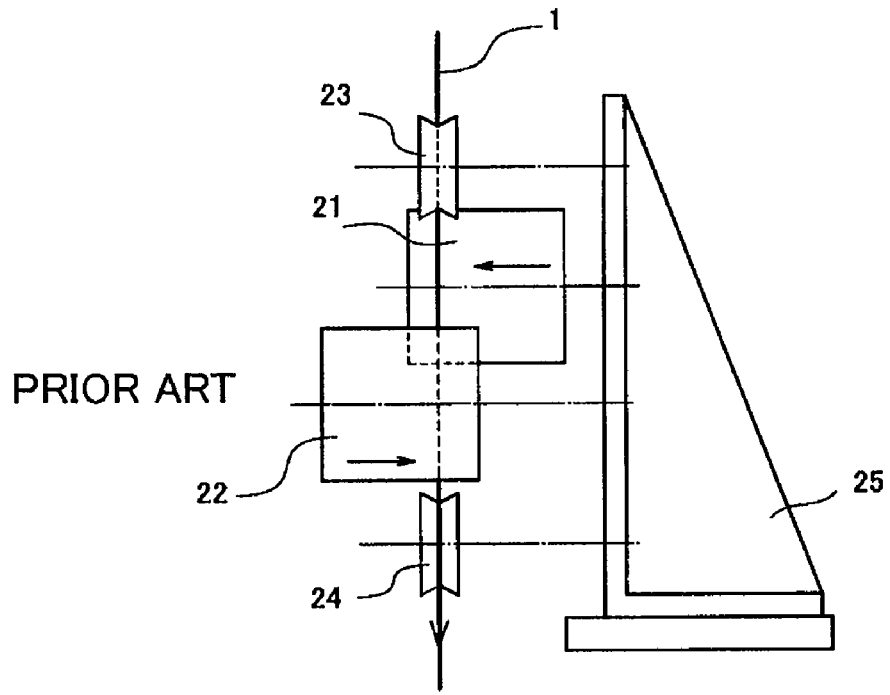
FIGS. 6A and 6B are drawings illustrating a conventional method.
Figure 6B:
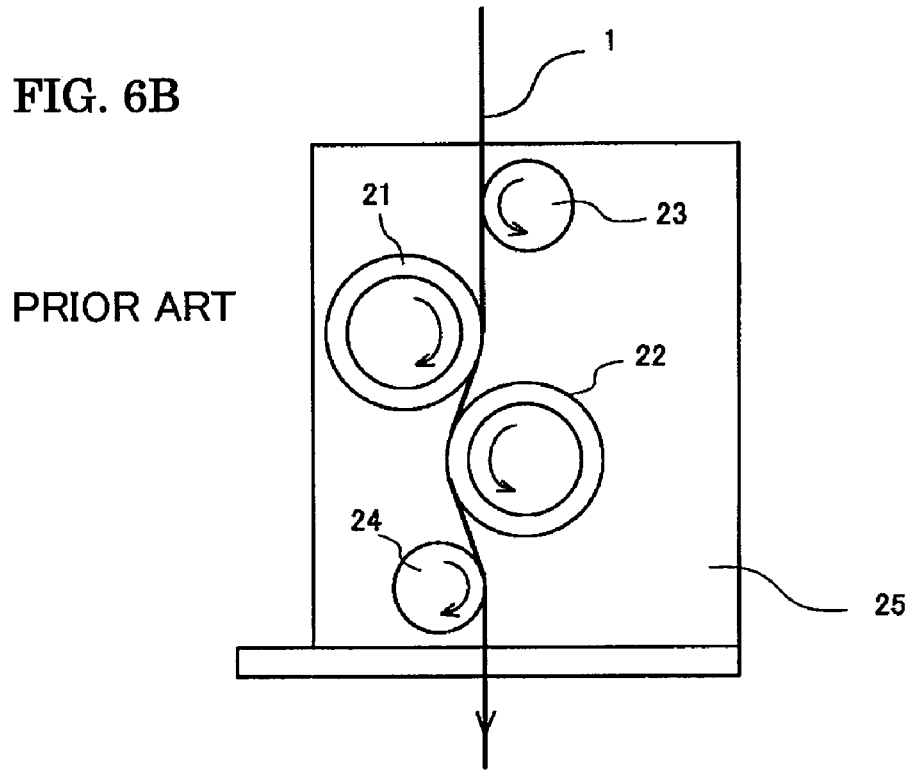

FIGS. 4A and 4B are conceptional schematic diagrams for explaining the positional relationship between an optical fiber and the brim portion of a guide roller in the optical fiber manufacturing equipment of the present invention. Depending on the conditions under which twists are afforded to an optical fiber by the oscillating mechanism of a guide roller, the optical fiber might hit the brim portion provided at both ends of the guide roller such that the optical fiber that is being rolled up might suffer from vibration or damage. Therefore, preferably the brim portion prepared at both ends of the guide roller is provided with a taper (taper angle γ) according to the inclination angle θ and the guide roller radius R. In order to avoid the optical fiber from hitting the outer circumferential periphery of the brim portion of the guide roller, the following formula must be satisfied:

$$\tan\vartheta \le \frac{T}{\sqrt{(R+H)^2 - R^2}},$$

where H represents the height of the brim portion provided at both ends of the roller, and T (tan γ=T/H) represents the thickness of the brim portion.

The following table shows the minimum value of the thickness T of the brim portion and the taper angle γ in the cases where the roller radius R are 20 mm, 35 mm, and 50 mm, while the height H of the brim portion is 5 mm (constant), and the inclination angle θ of the guide roller are 5°, 10°, 15°, and 16°.

TABLE

| Roller radius R mm | Brim height H mm | Inclination angle θ | Brim thickness T mm | Taper angle γ |
|---|---|---|---|---|
| 50 | 5 | 16 | 6.57 | 52.7 |
|  | 5 | 15 | 6.14 | 50.8 |
|  | 5 | 10 | 4.04 | 38.9 |
|  | 5 | 5 | 2.00 | 21.8 |
| 35 | 5 | 16 | 5.55 | 48.0 |
|  | 5 | 15 | 5.19 | 46.1 |
|  | 5 | 10 | 3.41 | 34.3 |
|  | 5 | 5 | 1.69 | 18.7 |
| 20 | 5 | 16 | 4.30 | 40.7 |
|  | 5 | 15 | 4.02 | 38.8 |
|  | 5 | 10 | 2.64 | 27.8 |
|  | 5 | 5 | 1.31 | 14.7 |

The larger the roller diameter, the larger the thickness T of the brim portion and the taper angle γ must be. For example, in order to prevent the optical fiber from hitting the outer circumferential periphery of the brim portion of the guide roller even if the inclination angle θ (oscillation angle) of the guide roller is 15°, the thickness T of the brim portion must be 6.1 mm or more (taper angle γ must be 51° or more) in the case where the roller radius is 50 mm. Also, in the case where the roller radius is 35 mm, the thickness T of the brim portion must be made equal to or more than 5.2 mm (the taper angle γ must be 46° or more), and in the case of the roller radius of 20 mm, the thickness T of the brim portion must be 4.0 mm or more (the taper angle γ: 39° or more).

In any examples as described above, the oscillating operation of a guide roller on which an optical fiber is caused to roll in contact with the surface thereof can be realized by a simple way of turning just at a constant speed and only in one direction the rotating shaft that supports the guide roller. When the PMD values of coated optical fibers were measured after rewinding with this method, they were reduced by about 40 to 70% as compared with the PMD values obtained before such rewinding, and thus the reduction in the PMD value was of the same degree as in the case of the conventional methods. Also, the PMD values were on the same level as those in the case of the conventional level.

According to this method, the drive of the rotating shaft to make the guide roller oscillate is done by a motor itself without changing the rotary motion of the motor into the rectilinear motion like the conventional method, and therefore the control of rotation is easy, and the oscillation mechanism can be constituted with a down-sized, simple and low-cost structure. Moreover, the oscillation of the guide roller can be performed continuously at a constant oscillation speed, including the reversing operation, without stoppage, and consequently uniform twists can be afforded to the optical fiber in alternate directions, which is also advantageous in terms of the characteristics (PMD reduction).

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

What is claimed is:

1. Equipment for manufacturing an optical fiber, the equipment being capable of affording alternate twists to the optical fiber and comprising:
   (1) a guide roller arranged in a manner intersecting the traveling direction of the optical fiber and causing the optical fiber to roll in contact with the surface thereof,
   (2) a roller supporting member for holding the guide roller in a manner allowing the guide roller to freely turn about an axial center X,
   (3) a driving unit to cause the guide roller to oscillate by making the roller supporting member to turn about rotating shafts having an axial center Y as its turning axis, the axial center Y being inclined relative to the axial center X, and
   (4) angle adjusting members installed at inner ends of the rotating shafts, respective such that the inclination angle of the axial center X relative to the axial center Y is changeable.

2. Equipment for manufacturing an optical fiber according to claim 1,
   wherein the roller supporting member is a roller supporting shaft along the axial center X.

3. Equipment for manufacturing an optical fiber according to claim 1,
   wherein the guide roller has a brim portion having a taper spreading outward at each end of the roller, and the inclination angle θ of the axial center X with respect to the axial center Y satisfies the following formula:

$$\tan\theta \leq \frac{T}{\sqrt{(R+H)^2 - R^2}}$$

where T is a thickness, and H is a height, of the brim portion, and R is a radius of the roller.

* * * * *